Feb. 6, 1962 B. M. MEIJER 3,020,428
STATOR FOR SINGLE-PHASE INDUCTION MOTORS
Filed March 31, 1958

INVENTOR
BAREND MARTINUS MEIJER
BY
AGENT

United States Patent Office 3,020,428
Patented Feb. 6, 1962

3,020,428
STATOR FOR SINGLE-PHASE INDUCTION MOTORS
Barend Martinus Meijer, Eindhoven, Netherlands, assignor to North American Philips Company, Inc., New York, N.Y., a corporation of Delaware
Filed Mar. 31, 1958, Ser. No. 725,211
Claims priority, application Netherlands Apr. 5, 1957
2 Claims. (Cl. 310—172)

This invention relates to stators for single-phase induction motors having two pole halves each comprising at least five evenly spaced pole portions of substantially equal circumferential length, the first pole portion of each pole half being unshaded and diametrically opposite to the first pole portions of the other pole half, whereas the last pole portion of each pole half is provided with a separate short-circuited shading coil, a magnetic shunt being provided in each pole half not only between the said first unshaded pole and the adjacent pole of the other pole half but also between said first pole and the penultimate pole portion of said other pole half, the latter shunt being effected through the other side of the separate short-circuited shading coil, which side is more remote from the rotor, whilst all the remaining pole portions of each pole half are provided with directly interconnected short-circuited shading coils.

Such a stator is described in U.S. Patent 2,741,715 for producing such phase displacement both in direction and in time of the fields of the pole portions that a substantially symmetrical rotating field is obtainable and hence speed variations and vibration of the rotor can be reduced to a permissible minimum; this is of importance, for example, in the case of driving motors for gramophones and magnetic recording and reproducing apparatus.

The said known motor not only satisfies the above-mentioned requirements but also the further requirement of at least substantially equal induction values around the air gap between the stator pole portions and the rotor in that the air gap between part of the stator pole portions and the rotor exceeds the air gap between another part of the stator pole portions and the rotor.

It has been found that the freedom of vibration of the motor can be further improved if, in accordance with the invention, the two magnetic shunts are intersected by a narrow air gap on either side of the separate short-circuited shading coils.

The latter air gap preferably has a length of from 0.03 to 2.5 mm.

Thus a third requirement for obtaining a circular rotating field is satisfied, namely that the intensity of the air-gap inductance between the pole portions connected to the unshaded pole portions by the magnetic shunts and the rotor varies at least substantially sinusoidally in each pole portion.

Figures 1, 2:
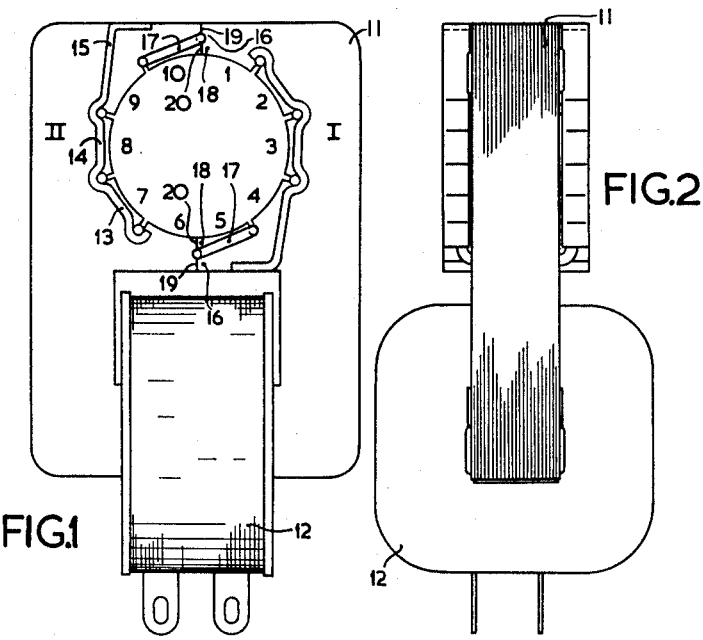
Figure 3:
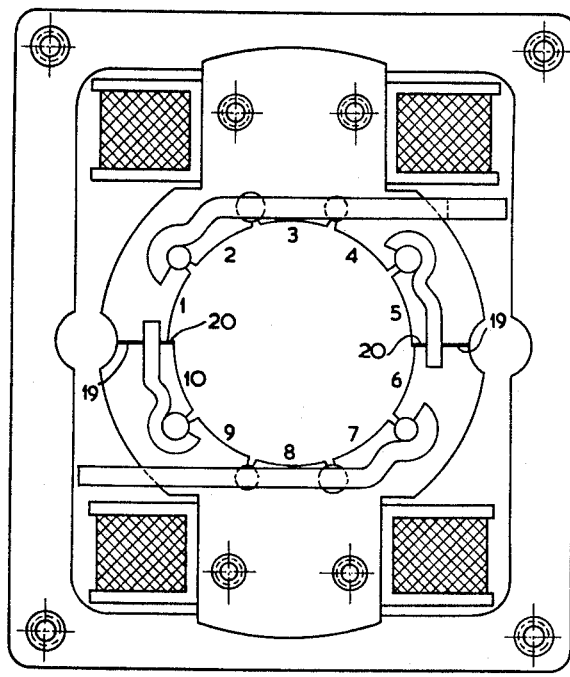

In order that the invention may be readily carried out, embodiments will now be described, by way of example, with reference to the accompanying diagrammatic drawings, in which FIGS. 1 and 2 are a front view and a side view respectively of a ten-pole stator and FIG. 3 is a front view of such a stator of the shell-type.

In FIG. 1, in which 11 denotes the stator and 12 the field winding, stator pole portions 1 to 5 form part of one pole half I and stator pole portions 6 to 10 form part of the other pole half II. The first two diametrically opposite pole portions 1 and 6 of each pole half I and II are unshaded, while pole portions 2, 3, 4 and 7, 8, 9 respectively are provided with interconnected short-circuited shading coils 13, 14 and 15. The pole portions 5 and 10 are encircled by separate short-circuited shading coils 17.

The requirement of symmetrical directional phase displacement is satisfied by the construction shown in the drawing, since the 10 pole portions provided along the circumference have substantially the same length and are equally spaced from one another. Each pole portion occupies approximately 36° of the circumference, so that the 10 pole portions together occupy the entire circumference of 360°.

The requirement for obtaining a rotating field which is symmetrical with regard to the phase displacement in time between the various fields of the pole portions 6 to 10 of the pole half II (the same holds for the fields of the pole portions 1–5 of the pole half I) is also satisfied, because the following phase displacements in time are produced (since the 10 pole portions occupy 360° here also, the field of each pole portion must be displaced in phase by 36° relatively to the field of a preceding pole portion):

$a_1$ between pole portions 6 and 7 = 36°
$a_2$ between pole portions 6 and 8 = 72°
$a_3$ between pole portions 6 and 9 = 108°
$a_4$ between pole portions 6 and 10 = 144°
$a_5$ between pole portions 6 and 1 = 180° the value $a_5$ between the two unshaded pole portions 6 and 1 being obtained of necessity, since these pole portions are directly connected magnetically to the two ends of the field winding 12.

The remaining phase displacements are obtained in the usual manner by the use of the short-circuited shading coils 13, 14, 15 and 17 and the correctly proportioned magnetic shunts 16 and 18 on both sides of the separate coils 17.

In order to ensure that these shunts have the required magnetic reluctance values, they are proportioned so that the ferromagnetic material adjacent the shunts is magnetically saturated.

It has, however, been found that the saturation of any part of the magnetic surface of the stator gives rise to an appreciable deviation of the desired circular rotating field, since the reluctance values in the shunts vary with variation of the inductance values therein.

This can be avoided by the provision of air gaps 19 and 20 having a length, of say, 1 mm. in the shunts 16 and 18, since the reluctance of an air-gap is independent of the value of the inductance. This ensures an at least substantially sinusoidal variation of the intensity of the inductance in the air gap between the pole portions 4, 5 and 9, 10 and the rotor.

FIG. 3 shows an example of a shell-type stator in accordance with the invention provided with two energizing windings. The longer air gaps between the coil portions 1 and 6 respectively and the rotor are clearly shown. In this shell-type motor the leakage is materially reduced so that the physical dimensions of the motor can also be reduced.

What is claimed is:
1. A stator for a single phase induction motor comprising two pole halves, each having at least five pole portions of substantially equal circumferential length and substantially equally spaced from one another, the first pole portion of each pole half being unshaded and diametrically opposed to the first pole portion of the other pole half, the last pole portion of each pole half being provided with a separate short-circuited shading coil, a magnetic shunt being provided in each pole half between the first unshaded pole and the adjacent pole of the other pole half and between the first pole and the penultimate pole of the other pole half, the latter shunt being effected through a side of the separate short circuited shading coil, which side is remote from the rotor of said induction motor, all the remaining pole portions of each pole half being provided with interconnected short circuited shading coils, and a narrow air gap on opposite sides of each separate short circuited shading coil.

2. A stator for a single phase induction motor as claimed in claim 1 wherein said air gap has a length of from 0.03 mm. to 2.5 mms.

References Cited in the file of this patent

UNITED STATES PATENTS

| | | |
|---|---|---|
| 2,073,526 | Pestarini | Mar. 9, 1937 |
| 2,490,905 | Hardie | Dec. 13, 1949 |
| 2,741,715 | Meijer | Apr. 10, 1956 |

FOREIGN PATENTS

| | | |
|---|---|---|
| 1,103,366 | France | Nov. 2, 1955 |